Figure 1:
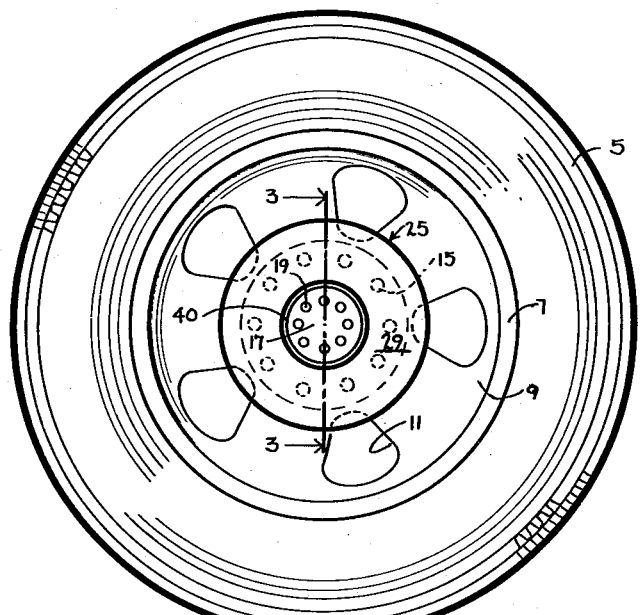

Jan. 3, 1961 W. T. BIELER 2,966,962
VEHICLE WORKING MEANS
Filed Feb. 4, 1957

INVENTOR.
WALTER T. BIELER
BY
ATTORNEY

United States Patent Office 2,966,962
Patented Jan. 3, 1961

2,966,962

VEHICLE WORKING MEANS

Walter T. Bieler, 1256 N. Hillside, Wichita, Kans., assignor of one-half to William C. Wilson, Wichita, Kans.

Filed Feb. 4, 1957, Ser. No. 637,994

3 Claims. (Cl. 184—106)

This invention relates to vehicles. In a more specific aspect this invention relates to means for working vehicle wheels to replace the bearings or other worn parts of same, to replace or repair the axle which mounts the wheel hub, etc., and in particular the invention relates to such wheels and operations on trucks, buses, and tractors. In a still more specific aspect this invention relates to container means mountable on the hub of a truck wheel which is mounted on the truck by a so-called floating axle, so that when the axle is pulled to replace or repair same and/or bearings and parts associated therewith, the relatively low viscosity grease which runs out of the wheel hub will be caught in the container, thus preventing the grease from running onto the floor or other work area.

Trucks having wheels which are mounted on so-called floating axles are well known, this being a widely used means for mounting rear wheels on trucks, such as the common three quarter and one ton size trucks. And, it is a usual practice to pull the axles on these trucks out through the wheel hub to work same and the parts therewith with or without the wheel and tire still mounted on the hub. It is very inconvenient to try to catch the grease which runs from the hub in a bucket or pan, and one man while removing the axle shaft flange from the hub finds it practically impossible to catch the heavy lubricant or grease. I have invented a light grease or heavy oil catcher which is particularly advantageously used on the hub of the rear wheels of these trucks while the axle is being pulled to catch the lubricant which runs out when the axle shaft flange is removed from the wheel hub. My new lubricant catcher can conveniently be left on the hub during working in the shop, and as the wheel parts are moved around the shop, the lubricant is maintained in the container or catcher for later disposal.

The new lubricant catcher of my invention for mounting on the hub of vehicle wheels has a housing with closed sides and apertures through opposite ends of the housing. One of these end apertures is of size to receive the hub of the vehicle wheel. The catcher has clamp means to hold same on the wheel hub. When the catcher is mounted on the wheel hub, it is adapted to receive and retain lubricant which runs out of the hub.

It is an object of this invention to provide new vehicle working means.

It is another object of this invention to provide new lubricant catcher means for mounting on the hub of vehicle wheels to catch lubricant oil or grease which might run therefrom while working the wheel.

Still another object of my invention is to provide lubricant catcher means for mounting on rear truck wheel hubs which are mounted on so-called floating axles to catch lubricant passing from the hub when the axle shaft flange is removed from the hub.

Yet another object of my invention is to provide simple and easy to use means to catch and retain grease in a shop to maintain the shop in orderly and clean condition.

Other objects and advantages of the new lubricant catcher means of my invention will become apparent to those skilled in the art upon reading this disclosure.

Drawings accompany and are a part of this disclosure. These drawings depict preferred specific embodiments of the new lubricant catcher device of my invention, and it is to be understood that such is not to unduly limit the scope of my invention. In the drawings, Fig. 1 is an elevation view showing a preferred specific embodiment of the new lubricant catcher means of my invention mounted on the hub of a truck wheel.

Figures 2, 3:
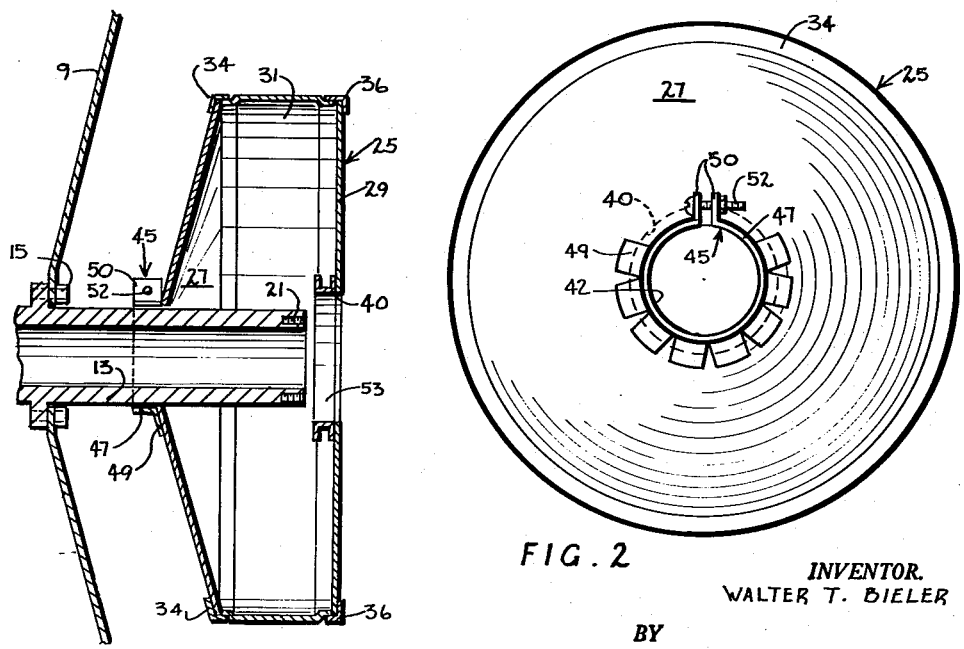

Fig. 2 is an enlarged elevation view of the lubricant catcher of Fig. 1 viewed from the rear end which is mounted toward the truck wheel. Fig. 3 is an enlarged cross sectional view taken on line 3—3 of Fig. 1.

Following is a discussion and description of the new lubricant catcher means of my invention made with reference to the drawings whereon the same reference numerals are used to indicate the same or similar parts and/or structure. The discussion and description are of preferred specific embodiments of the new lubricant catcher means of my invention, and it is to be understood that such is not to unduly limit the scope of my invention.

Fig. 1 shows a side view of a truck tire 5 mounted on wheel rim 7 which is attached to wheel flange 9 which normally has spaced apertures 11 therethrough. The wheel flange 9 fits around the wheel hub 13, and it is held in desired fixed relation to the wheel hub 13 by nut and bolt means 15. The usual wheel brake drum is not shown in the drawings, since it has nothing to do with the invention. Axle shaft flange 17 fits over the outer end of hub 13 and is held thereon by bolt means 19 which fit into threaded holes 21 in hub 13. The axle shaft flange and axle have been omitted from Fig. 3. They are of the usual and common type commonly called the full floating type. The full floating construction enables easy removal of the axle shafts without removing the truck load or jacking up the rear axle. The axle shaft and axle shaft flange 17 are removed together when bolts 19 have been removed. When this is done lubricant runs out the end of the hub and if it is not caught, it spills on the floor, or on the flange 9, rim 7 and tire 5 as well as the floor if the wheel is still mounted on hub 13. Catching this usual low viscosity grease is what my new device is designed to do.

The grease and/or oil catcher 25 of my invention preferably has a drum-like housing with a convex inner end 27 and a substantially flat outer end 29. The sides or wall 31 of the catcher 25 are joined to the ends 27 and 29 by edging members 34 and 36, respectively, in any suitable manner, such as by welding. The wall or sides 31, ends 27 and 29 and edging members 34 and 36 are preferably made separate out of sheet metal, and this can be done by the usual cutting and braking means and method. However, if desired, the catcher can be made of plastic material by the usual molding and forming methods and means.

The end member 29 has a hole 40 therein and a corresponding hole 42 is formed in the other end member 27. The size of hole 40 can be any suitable size to make it easy to slip a wrench therethrough to remove bolts 19 from hub 13, while at the same time providing enough holding space to catch and retain the lubricant spilling from hub 13 into the lower part of the catcher 25. Hole 42 in end member 27 is made large enough to fit over hub 13 comfortably but easily, and this hole is used to easily empty the catcher 25 of lubricant when removed from hub 13 by pouring the lubricant out of the hole 42. In this connection the convex shape of end member 27 is desired to assure complete removal of the lubricant from catcher 25 when emptying same.

Split-ring clamp 45 is preferably mounted on the outside of end member 27 around hole 42 therein. The clamp body 47 is preferably made wide enough to support catcher 25 on hub 13 in the manner shown in Fig. 3, and the body 47 is preferably attached to end member 27 by finger portions 49 integral with the body 47 and fixed to end 27 in any suitable manner such as by welding. The free end portions of the clamp ring 45 are bent in the end portions 50 to receive bolt and nut means 52 through apertures therethrough. Thus, the clamp means can be used to vary the size of the hole therethrough or to snugly hold catcher 25 on hub 13 upon tightening the clamp. Sheet metal can conveniently be used to form clamp 45.

A lip member 53 with a channel as shown in Fig. 3 is preferably suitably attached to the inside of end member 29 around the periphery of hole 40. This lip and channel member 53 serves to catch low viscosity grease dripping off the sides and ends of the catcher when such is rotated with grease therein, this normally occurring in shop practices. The lip 53 provides for the grease remaining in the catcher 25 until it is desired to pour it therefrom through hole 42.

As will be evident to those skilled in the art, various modifications of this invention can be made or followed, in the light of this discussion and disclosure, without departing from the spirit or scope of the disclosure or from the scope of the claims.

I claim:
1. A lubricant catcher and retainer for working truck wheels having a wheel flange with an aperture therethrough and mountable on the wheel hub closed by an axle shaft flange comprising, in combination, a circular drum-like housing having a convex inner end and a substantially flat outer end, a co-axial circular hole in said outer end of size larger than the outer end portion of said hub of said wheel, said outer end of said housing having an inwardly turned lip around the periphery of said hole therein, a co-axial circular hole in said inner end of said housing of size to receive said outer end portion of said hub, clamp means attached to said inner end of said housing on the outside thereof of size to fit over said outer end portion of said hub when expanded and constructed and operative to hold said housing on said outer end portion of said hub when contracted therearound, and means to expand and contract said clamp means, and said drum-like housing being a container constructed and mountable on said outer end portion of said hub of said wheel to receive and retain lubricant running out of said hub when said axle shaft flange is removed from said hub.

2. A lubricant catcher for mounting on the hub of vehicle wheels on the outer end portion thereof comprising, in combination, a drum-like structure having an aperture through each end of size to receive the outer end portion of said hub, one end of said drum-like structure being convex, the other end having an inwardly turned lip around the periphery of the hole therein, clamp means attached to the outside of said convex end of said drum-like structure and constructed and operative to mount said drum-like structure on said outer end portion of said hub, and said drum-like structure being a container constructed and mountable on said outer end portion of said hub to receive and hold lubricant running out of said hub.

3. A lubricant catcher for mounting on the hub of vehicle wheels on the outer end portion thereof comprising, in combination, a drum-like structure having an aperture through each end of size to receive the outer end portion of said hub, one end of said structure having an inwardly turned lip around the periphery of the aperture therein, adjustable clamp means attached to the outside of the other end of said structure and constructed and operative to mount said drum-like structure on said outer end portion of said hub, and said drum-like structure being a container constructed and mountable on said outer end portion of said hub to receive and hold lubricant running out of said hub.

References Cited in the file of this patent

UNITED STATES PATENTS

| | | |
|---|---|---|
| 37,084 | Burr et al. | Dec. 9, 1862 |
| 828,896 | Muir | Aug. 21, 1906 |
| 1,055,574 | Tripp | Mar. 11, 1913 |
| 1,473,664 | Beightol | Nov. 13, 1923 |
| 2,647,589 | Kerr | Aug. 4, 1953 |

FOREIGN PATENTS

| | | |
|---|---|---|
| 327,244 | Germany | Oct. 8, 1920 |